United States Patent
Ohmura et al.

(10) Patent No.: US 12,148,221 B2
(45) Date of Patent: Nov. 19, 2024

(54) VIDEO PROCESSING DEVICE AND VIDEO PROCESSING SYSTEM

(71) Applicant: Panasonic Intellectual Property Management Co., Ltd., Osaka (JP)

(72) Inventors: Yohei Ohmura, Kanagawa Ken (JP); Yuji Matsumoto, Kanagawa Ken (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 197 days.

(21) Appl. No.: 17/953,683

(22) Filed: Sep. 27, 2022

(65) Prior Publication Data

US 2023/0020662 A1    Jan. 19, 2023

Related U.S. Application Data

(63) Continuation of application No. PCT/JP2021/002904, filed on Jan. 27, 2021.

(30) Foreign Application Priority Data

Apr. 28, 2020   (JP) ................................ 2020-079731

(51) Int. Cl.
   *G06V 20/56*      (2022.01)
   *B60R 1/27*        (2022.01)
   (Continued)

(52) U.S. Cl.
   CPC ............... *G06V 20/56* (2022.01); *B60R 1/27* (2022.01); *G06F 3/14* (2013.01); *G09G 3/2092* (2013.01)

(58) Field of Classification Search
   CPC .... G06V 20/56; B60R 1/27; B60R 2300/806; G06F 3/14; G06F 3/1423; G09G 3/2092;
   (Continued)

(56) References Cited

U.S. PATENT DOCUMENTS

| 11,178,345 B2 | 11/2021 | Sakurai |
| 11,363,216 B2 | 6/2022 | Sakurai |

(Continued)

FOREIGN PATENT DOCUMENTS

| JP | 2014-229049 | 12/2014 |
| WO | 2016/072065 | 5/2016 |
| WO | 2019/172167 | 9/2019 |

OTHER PUBLICATIONS

International Search Report (ISR) from International Searching Authority (Japan Patent Office) in International Pat. Appl. No. PCT/JP2021/002904, dated Apr. 6, 2021, together with an English language translation.

*Primary Examiner* — John W Miller
*Assistant Examiner* — Omer Khalid
(74) *Attorney, Agent, or Firm* — GREENBLUM & BERNSTEIN, P.L.C.

(57) ABSTRACT

A video processing device installable in a vehicle is disclosed. The vehicle includes a first imaging device, a first display device, and a second display device. The first imaging device images the outside of the vehicle and generates a first video. The first display device displays a second video obtained by performing first processing on the first video. The second display device displays a third video obtained by performing second processing on the first video. The video processing device includes a first reception device, a video processing device, a first transmission device, and a second transmission device. The first reception device receives the first video from the first imaging device. The video processing device performs the second processing on the first video. The first transmission device transmits the first video to the first display device. The second transmission device transmits the third video to the second display device.

15 Claims, 4 Drawing Sheets

(51) Int. Cl.
*G06F 3/14* (2006.01)
*G09G 3/20* (2006.01)

(58) Field of Classification Search
CPC .... G09G 3/2096; G09G 2380/10; H04N 7/18;
H04N 1/00129; H04N 21/4122; H04N
23/63; H04N 5/202; H04N 9/69; B60K
2360/173; B60K 35/28; B60K 35/10;
B60K 35/00
USPC .......................................................... 348/148
See application file for complete search history.

(56) References Cited

U.S. PATENT DOCUMENTS

| | | | |
|---|---|---|---|
| 11,689,812 B2 * | 6/2023 | Seo | H04N 23/90 |
| | | | 348/38 |
| 2016/0031370 A1 * | 2/2016 | McElroy | B60R 1/28 |
| | | | 348/148 |
| 2017/0147270 A1 * | 5/2017 | Kim | B60R 11/02 |
| 2017/0232897 A1 | 8/2017 | Itoh | |
| 2018/0109755 A1 * | 4/2018 | Vaid | H04N 7/18 |
| 2018/0301122 A1 * | 10/2018 | Katsuyama | B60R 1/04 |
| 2019/0132555 A1 * | 5/2019 | Chu | G01S 17/931 |
| 2020/0039524 A1 * | 2/2020 | Chu | G07C 5/0841 |

* cited by examiner

VIDEO PROCESSING DEVICE AND VIDEO PROCESSING SYSTEM

CROSS-REFERENCE TO RELATED APPLICATIONS

This application is a bypass continuation application of International Application No. PCT/JP2021/002904, filed Jan. 27, 2021, which designates the United States, and is incorporated herein by reference, and which claims the benefit of priority from Japanese Patent Application No. 2020-079731, filed Apr. 28, 2020, the entire contents of which are incorporated herein by reference.

FIELD

Embodiments described herein relate generally to a video processing device and a video processing system.

BACKGROUND

There is a known technique that the outside of a vehicle is captured by a camera or the like attached to a vehicle body to utilize the video for various use such as checking a rearward view of the vehicle and recording a vehicle outside video (for example, Japanese Patent Application Laid-open No. 2014-229049).

In a case of being used for checking a rearward view of the vehicle, the imaged video is subjected to predetermined processing performed by a display unit, for example, and projected on an electron mirror included in the display unit.

In a case of being used for recording a vehicle outside video, the imaged video is subjected to predetermined processing performed by a drive recorder unit, for example, and projected on a panel type display and the like.

SUMMARY

A video processing device according to one aspect of the present disclosure is installable in a vehicle. The vehicle includes a first imaging device, a first display device, and a second display device. The first imaging device is configured to image the outside of the vehicle and generate a first video. The first display device is configured to display a second video obtained by performing first processing on the first video. The second display device is configured to display a third video obtained by performing second processing on the first video. The video processing device includes a first reception device, a video processing device, a first transmission device, and a second transmission device. The first reception device is configured to receive the first video from the first imaging device. The video processing device is configured to perform the second processing on the first video. The first transmission device is configured to transmit the first video to the first display device. The second transmission device is configured to transmit the third video to the second display device.

These comprehensive or specific aspects may be implemented by a system, a method, an integrated circuit, a computer program, or a recording medium, or may be implemented by optionally combining a system, a device, a method, an integrated circuit, a computer program, and a recording medium.

DETAILED DESCRIPTION

The following describes embodiments of a video processing device and a video processing system according to the present disclosure with reference to the drawings.

Configuration Example of Vehicle

Figure 1:
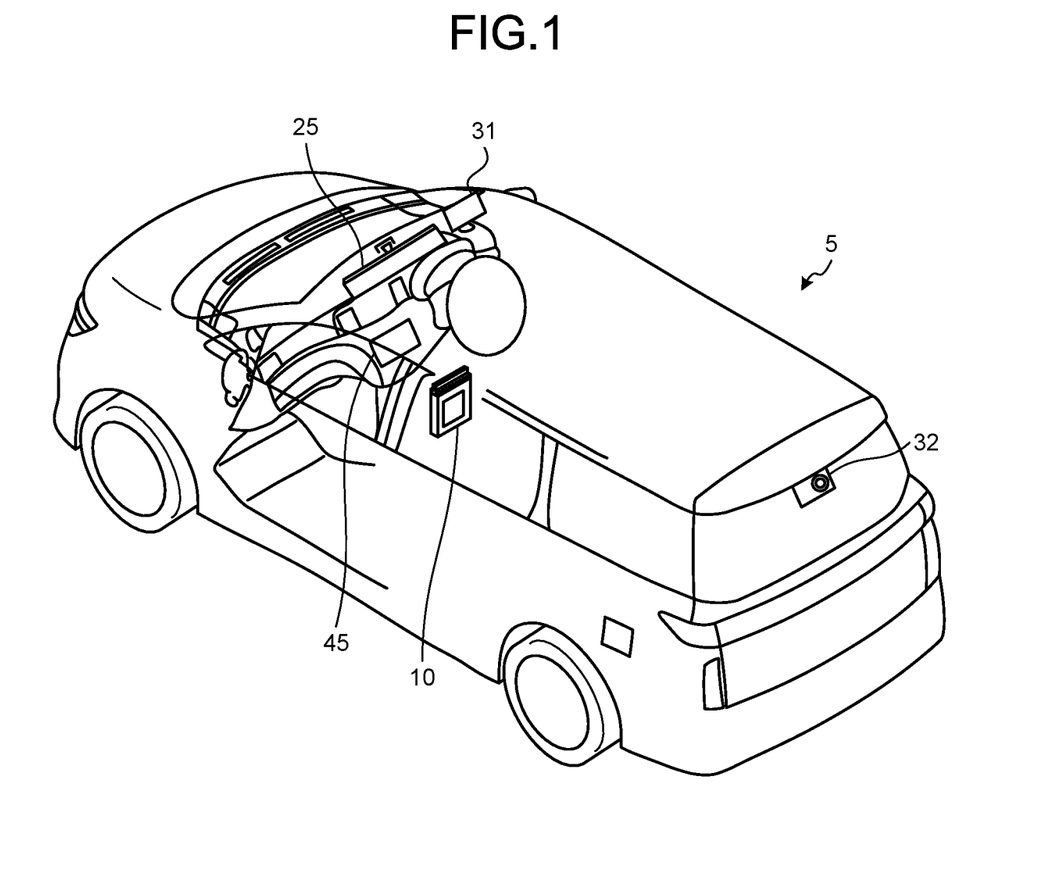
FIG. 1 is a schematic diagram illustrating an example of a vehicle including a drive recorder unit according to an embodiment.

FIG. 1 is a schematic diagram illustrating an example of a vehicle 5 including a drive recorder unit 10 according to an embodiment. As illustrated in FIG. 1, the vehicle 5 according to the embodiment includes, for example, the drive recorder unit 10, a front camera 31, a rear camera 32, a display device 25, and a display 45.

The front camera 31 is disposed on a windshield and the like of the vehicle 5, for example. The front camera 31 images a forward view of the vehicle 5, and generates a forward video as a fourth video. The front camera 31 is an example of a second imaging device.

The rear camera 32 is disposed on a rear window and the like of the vehicle 5, for example. The rear camera 32 images a rearward view of the vehicle 5, and generates a rear video as a first video. The rear camera 32 is an example of a first imaging device.

The drive recorder unit 10 is housed in a console box and the like of the vehicle 5, for example. The drive recorder unit 10 performs predetermined processing on the forward video imaged by the front camera 31 and the rear video imaged by the rear camera 32. The drive recorder unit 10 is an example of a video processing device.

The display device 25 is a liquid crystal display and the like on which a rearward view of the vehicle is projected, for example, a mirror type electron mirror and the like in a shape of a mirror for checking a rearward view of the vehicle. The display device 25 displays the rear video on which predetermined processing is performed by an electronic control unit (ECU) that is formed integrally with the display device 25, for example. The display device 25 is an example of a first display device. The electron mirror is an example of a mirror type display device.

In FIG. 1, the display device 25 is configured as an electron mirror in a shape of a room mirror. However, in a case where the display device 25 is configured as the electron mirror, the display device 25 may have a shape of another mirror for checking rearward such as a door mirror or a fender mirror, for example.

The display 45 is a panel type liquid crystal display or the like inserted into an instrument panel and the like, for example. The display 45 displays the forward video and the rear video processed by the drive recorder unit 10. The display 45 is an example of a second display device.

The display 45 may display a video of another camera (not illustrated) disposed on a side surface, inside a compartment, or the like of the vehicle 5, or may display an omnidirectional overhead view video and the like obtained by compositing videos of multiple cameras that image the outside of the vehicle including the front camera 31 and the rear camera 32.

The drive recorder unit 10, the front camera 31, the rear camera 32, the display device 25, and the display 45 described above are part of a video processing system to be described later.

Configuration Example of Video Processing System

Figure 2:
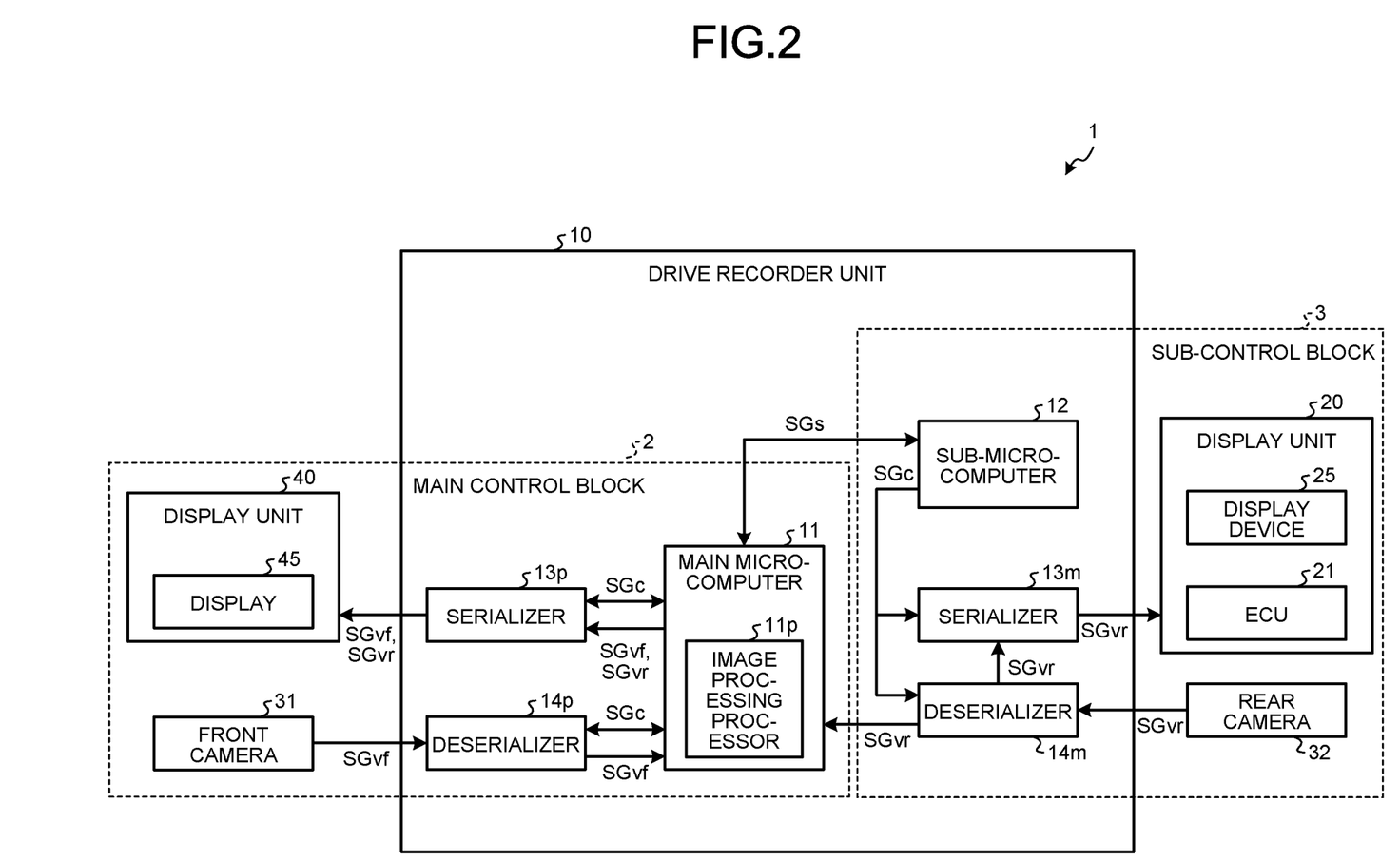
FIG. 2 is a block diagram illustrating an example of a configuration of a video processing system according to the embodiment.

FIG. 2 is a block diagram illustrating an example of a configuration of a video processing system 1 according to the embodiment. As illustrated in FIG. 2, the video processing system 1 according to the embodiment includes the drive recorder unit 10, a display unit 20, the front camera 31, the rear camera 32, and a display unit 40, and is configured to be installable in the vehicle 5 described above, for example.

The drive recorder unit 10 includes a main microcomputer 11, a sub-microcomputer 12, a serializer 13$p$, a serializer 13$m$, a deserializer 14$p$, and a deserializer 14$m$.

The main microcomputer 11 is a computer including a central processing unit (CPU), a read only memory (ROM), and a random access memory (RAM). The main microcomputer 11 is configured to be a System on Chip (SoC) including an image processing processor 11$p$ and the like that perform processing on the forward video, the rear video, and the like, for example. The main microcomputer 11 is an example of a second control unit or a second control device. The image processing processor 11$p$ is an example of a video processing unit or a video processing device.

The main microcomputer 11 receives the forward video generated by the front camera 31 as a video signal SGvf from the deserializer 14$p$. The image processing processor 11$p$ performs processing on the forward video. The main microcomputer 11 receives the rear video generated by the rear camera 32 as a video signal SGvr from the deserializer 14$m$. The image processing processor 11$p$ performs processing on the rear video. In video processing performed by the image processing processor 11$p$, colors and contrast are adjusted to be suitable for recording of a vehicle outside video and display on the display 45, for example.

The main microcomputer 11 also controls the serializer 13$p$ and the deserializer 14$p$ by transmitting a control signal SGc to the serializer 13$p$ and the deserializer 14$p$.

For example, when the forward video is transmitted from the front camera 31 to the drive recorder unit 10, the main microcomputer 11 causes the deserializer 14$p$ to receive the forward video from the front camera 31.

Also, for example, after performing processing on the forward video and the rear video, the main microcomputer 11 causes the serializer 13$p$ to transmit the processed forward video and rear video to the display unit 40.

The forward video and the rear video subjected to the processing performed by the main microcomputer 11 are also stored as recorded videos in a storage region in the main microcomputer 11.

The main microcomputer 11 notifies the sub-microcomputer 12 of various statuses by transmitting a status signal SGs to the sub-microcomputer 12. The various statuses include information about whether a failure occurs in a main control block 2 (described later) and the like in addition to a status of the main microcomputer 11 itself.

On receiving the control signal SGc from the main microcomputer 11, the deserializer 14$p$ serving as a conversion unit receives the forward video transmitted from the front camera 31. At this point, the deserializer 14$p$ converts the forward video transmitted as the serialized video signal SGvf into parallel data. Also, the deserializer 14$p$ transmits the parallelized forward video in a form of the video signal SGvf to the main microcomputer 11. The deserializer 14$p$ is an example of a second reception unit or a second reception device.

On receiving the control signal SGc from the main microcomputer 11, the serializer 13$p$ serving as a conversion unit transmits, to the display unit 40, the processed forward video and rear video received from the main microcomputer 11. At this point, the serializer 13$p$ converts the parallelized forward video and rear video into serial data to be transmitted to the display unit 40 as the video signal SGvf and the video signal SGvr, respectively. The serializer 13$p$ is an example of a second transmission unit or a second transmission device.

The sub-microcomputer 12 is a computer including a CPU, a ROM, and a RAM, and is configured as a micro controller unit (MCU), for example. The sub-microcomputer 12 is an example of a first control unit or a first control device.

The sub-microcomputer 12 controls the serializer 13$m$ and the deserializer 14$m$ by transmitting the control signal SGc to the serializer 13$m$ and the deserializer 14$m$.

For example, when the rear video is transmitted from the rear camera 32 to the drive recorder unit 10, the sub-microcomputer 12 causes the deserializer 14$m$ to receive the rear video from the rear camera 32.

Also, for example, when the deserializer 14$m$ receives the rear video, the sub-microcomputer 12 causes the serializer 13$m$ to transmit the unprocessed rear video to the display unit 20.

The sub-microcomputer 12 notifies the main microcomputer 11 of various statuses by transmitting the status signal SGs to the main microcomputer 11. The various statuses include information about whether a failure occurs in a sub-control block 3 to be described later and the like in addition to a status of the sub-microcomputer 12 itself.

On receiving the control signal SGc from the sub-microcomputer 12, the deserializer 14$m$ serving as a conversion unit receives the rear video transmitted from the rear camera 32. At this point, the deserializer 14$m$ converts the rear video transmitted as the serialized video signal SGvr into parallel data. Also, the deserializer 14$m$ transmits the parallelized rear video to the main microcomputer 11 and the serializer 13$m$ in a form of the video signal SGvr. The deserializer 14$m$ is an example of a first reception unit or a first reception device.

On receiving the control signal SGc from the sub-microcomputer 12, the serializer 13$m$ serving as a conversion unit transmits the unprocessed rear video received from the deserializer 14$m$ to the display unit 20. At this point, the serializer 13$m$ converts the parallelized rear video into serial data to be transmitted to the display unit 20 as the video signal SGvr. The serializer 13$m$ is an example of a first transmission unit or a first transmission device.

Transmission of the control signal SGc from the main microcomputer 11 to the serializer 13$p$ and the deserializer 14$p$, and transmission of the control signal SGc from the sub-microcomputer 12 to the serializer 13$m$ and the deserializer 14$m$ are performed in an Inter-Integrated Circuit (I2C) format, for example.

Transmission and reception of the video signal SGvp between the main microcomputer 11, and the serializer 13$p$ and the deserializer 14$p$, and transmission of the video signal SGvr from the deserializer 14$m$ to the main microcomputer 11 and the serializer 13$m$ are performed in a Mobile Industry Processor Interface (MIPI) format, for example.

Transmission and reception of the video signal SGvf and the video signal SGvr between the serializer 13$p$, the serializer 13m, the deserializer 14p, and the deserializer 14m, and the front camera 31, the rear camera 32, the display unit 20, and the display unit 40 are performed in a Flat Panel Display-Link III (FPD-Link III) format, for example.

For example, a coaxial cable, Wi-Fi (registered trademark), or the like can be used for such video transmission.

Transmission and reception of the status signal SGs between the main microcomputer 11 and the sub-microcomputer 12 are performed in a Universal Asynchronous Receiver/Transmitter (UART) format, for example.

The display unit 40 includes, for example, the display 45 of a panel type, and is configured as part of an In-Vehicle Infotainment (IVI) system, for example.

The processed forward video and rear video received from the drive recorder unit 10 by the display unit 40 are passed to the display 45, displayed on the display 45, and used for displaying a situation outside the vehicle in parking support, displaying a parking space, displaying a parking route, and the like.

The display unit 20 includes an ECU 21 and the display device 25.

The ECU 21 receives the unprocessed rear video from the drive recorder unit 10, and performs processing thereon. In the video processing performed by the ECU 21, for example, colors and contrast are adjusted to be suitable for display on the display device 25.

The rear video processed by the ECU 21 is passed to the display device 25, displayed on the display device 25, and used for checking a rearward view of the vehicle 5 and the like, for example.

Alternatively, the display unit 20 can directly receive the rear video from the rear camera 32. That is, the function of receiving the rear video from the drive recorder unit 10 can also be used as a function of receiving the rear video from the rear camera 32.

The main microcomputer 11, the serializer 13p, the deserializer 14p, the front camera 31, and the display unit 40 constitute the main control block 2. In the main control block 2, the serializer 13p, the deserializer 14p, the front camera 31, and the display unit 40 are managed by the main microcomputer 11. The main microcomputer 11 appropriately notifies the sub-microcomputer 12 of a status such as whether a failure occurs in the main control block 2 including the main microcomputer 11. The main control block 2 is an example of a second block.

The sub-microcomputer 12, the serializer 13m, the deserializer 14m, the rear camera 32, and the display unit 20 constitute the sub-control block 3. In the sub-control block 3, the serializer 13m, the deserializer 14m, the rear camera 32, and the display unit 20 are managed by the sub-microcomputer 12. The sub-microcomputer 12 appropriately notifies the main microcomputer 11 of a status such as whether a failure occurs in the sub-control block 3 including the sub-microcomputer 12. The sub-control block 3 is an example of a first block.

The main control block 2 and the sub-control block 3 can operate independent of each other. Thus, even if a certain failure occurs in the main control block 2, for example, the sub-control block 3 can continuously operate. By such continuous operation of the sub-control block 3, the display device 25 can continuously display the rear video, for example.

The main microcomputer 11 and the sub-microcomputer 12 can operate independent of each other. Thus, even if a certain failure occurs in the main microcomputer 11, for example, the sub-microcomputer 12 continuously operates, and the display device 25 continuously displays the rear video, for example.

Processing Example of Drive Recorder Unit

Figure 3:
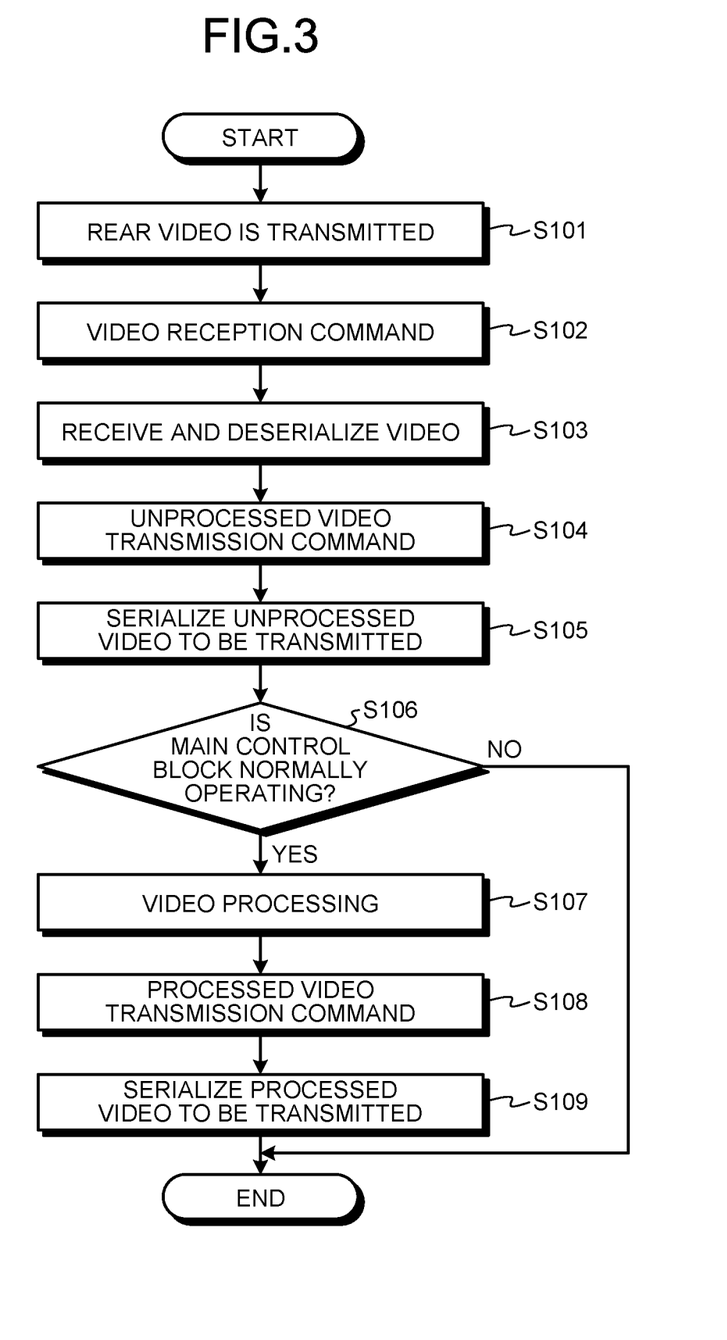
FIG. 3 is a flowchart illustrating an example of a processing procedure performed by the drive recorder unit according to the embodiment.

Next, the following describes an example of processing performed by the drive recorder unit 10 according to the embodiment with reference to FIG. 3. FIG. 3 is a flowchart illustrating an example of a processing procedure performed by the drive recorder unit 10 according to the embodiment. With reference to the flowchart of FIG. 3, the following describes a processing example in a case of acquiring the rear video from the rear camera 32.

As illustrated in FIG. 3, when the rear video is transmitted to the drive recorder unit 10 from the rear camera 32 (Step S101), the sub-microcomputer 12 transmits, as the control signal SGc, a reception command for the rear video to the deserializer 14m (Step S102).

On receiving the command from the sub-microcomputer 12, the deserializer 14m receives the rear video as the video signal SGvr from the rear camera 32 and deserializes the received rear video to be converted into parallel data (Step S103). Also, the deserializer 14m transmits the parallelized rear video as the video signal SGvr to the main microcomputer 11 and the serializer 13m.

The sub-microcomputer 12 transmits, as the control signal SGc, a transmission command for the unprocessed rear video to the serializer 13m (Step S104).

On receiving the command from the sub-microcomputer 12, the serializer 13m serializes the unprocessed rear video received from the deserializer 14m to be transmitted to the display unit 20 as the video signal SGvr (Step S105).

At this point, the subsequent processing branches depending on whether or not the main control block 2 is normally operating, (Step S106). If the main control block 2 is not normally operating (No at Step S106), the following processing is not performed.

At this point, the sub-microcomputer 12 receives, as the status signal SGs, a status indicating that a failure occurs in the main control block 2 from the main microcomputer 11. However, for example, in a case where a failure occurs in the main microcomputer 11 itself, the status signal SGs is not necessarily transmitted from the main microcomputer 11. The processing at Steps S104 to S105 described above is performed by the sub-microcomputer 12 irrespective of whether the main control block 2 including the main microcomputer 11 is normally operating.

When the main control block 2 is normally operating (Yes at Step S106), the main microcomputer 11 acquires the rear video as the video signal SGvr from the deserializer 14m, and the image processing processor 11p performs processing on the rear video (Step S107).

The main microcomputer 11 transmits, as the video signal SGvr, the rear video subjected to processing performed by the image processing processor 11p to the serializer 13p, and transmits the transmission command for the rear video as the control signal SGc (Step S108).

On receiving the command from the main microcomputer 11, the serializer 13p serializes the processed rear video received from the main microcomputer 11 to be transmitted as the video signal SGvr to the display unit 40 (Step S109).

Accordingly, the processing performed by the drive recorder unit 10 according to the embodiment ends.

The processing at Steps S104 to S105 and the processing at Steps S106 to S109 described above may be performed in parallel.

Comparative Example

Figure 4:
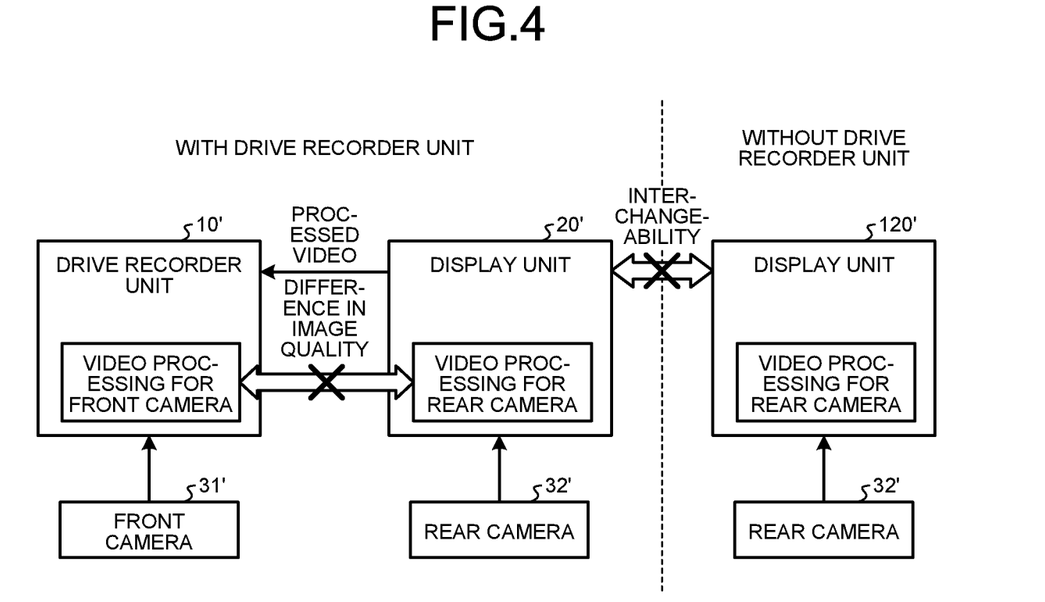
FIG. 4 is a schematic diagram illustrating a schematic configuration of a drive recorder unit and a display unit according to a comparative example.
Figure 5:
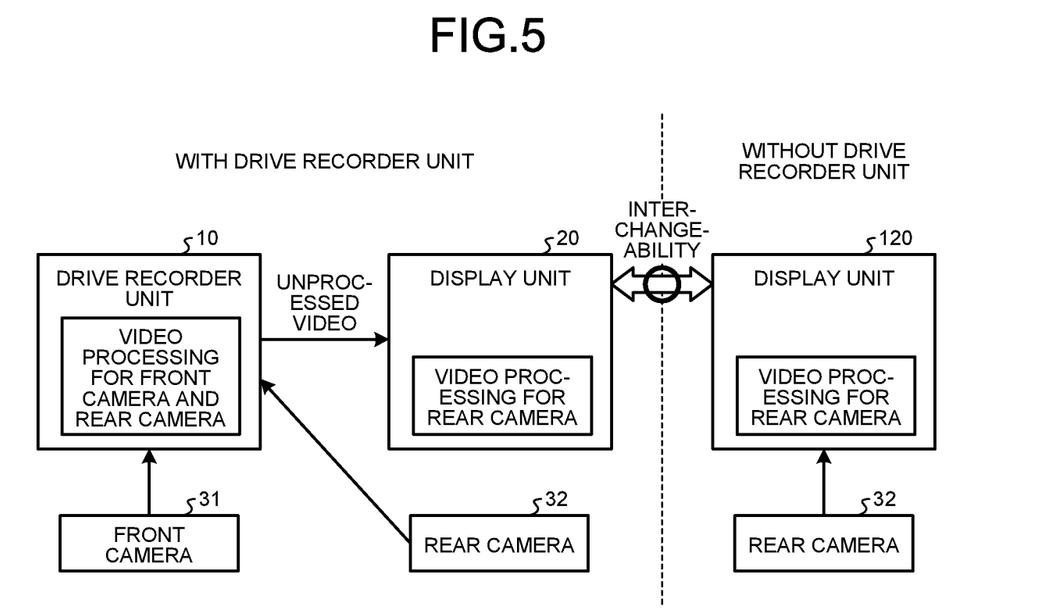
FIG. 5 is a schematic diagram illustrating a schematic configuration of the drive recorder unit and a display unit according to the embodiment.

Next, the following describes the drive recorder unit 10 according to the embodiment as compared with a comparative example with reference to FIG. 4 and FIG. 5. FIG. 4 is a schematic diagram illustrating a schematic configuration of a drive recorder unit 10' and a display unit 20' according to the comparative example.

As illustrated in FIG. 4, in the configuration of the comparative example, a rear video from a rear camera 32' is transmitted to the display unit 20'. After performing processing on the rear video received from the rear camera 32' to be suitable for display on a display device such as an electron mirror, the display unit 20' transmits the processed rear video to the drive recorder unit 10'.

Thus, the display unit 20' also has a transmission function for the rear video in addition to a reception function for the rear video.

On the other hand, a forward video from a front camera 31' is transmitted to the drive recorder unit 10'. The drive recorder unit 10' performs processing on the forward video received from the front camera 31' to be suitable for display on a panel type display.

However, in the configuration according to the comparative example, the rear video on which video processing was performed by the display unit 20' and the forward video on which video processing was performed by the drive recorder unit 10' are recorded on the drive recorder unit 10' and displayed on the panel type display. However, image quality of the videos displayed on the panel type display may be different from each other.

Moreover, in an existing display unit 120', the rear video from the rear camera 32' is exclusively used for display on a display device such as an electron mirror. Thus, the display unit 120' has only a reception function for the rear video. In a case of diverting the display unit 120' to the display unit 20' according to the comparative example, a video transmission function needs to be added to the display unit 120'. Accordingly, cost is increased and a component mounting space is enlarged due to addition of the transmission function.

Moreover, the display units 20' and 120' need to be prepared for both a case of being connected to the drive recorder unit 10' and a case of not being connected thereto. Accordingly, the number of components for constituting the display unit is increased.

FIG. 5 is a schematic diagram illustrating a schematic configuration of the drive recorder unit 10 and the display unit 20 according to the embodiment.

As illustrated in FIG. 5, with the drive recorder unit 10 according to the embodiment, the forward video and the rear video recorded in the drive recorder unit 10 and displayed on the display 45 are both subjected to video processing performed by the drive recorder unit 10. Due to this, image quality of the rear video used for plural uses can be aligned with image quality of the forward video.

With the drive recorder unit 10 according to the embodiment, the drive recorder unit 10 transmits the unprocessed rear video received from the rear camera 32 as it is to the display unit 20. With this configuration, the display unit 20 can independently perform video processing on the rear video to satisfy an object of the display unit 20.

With the drive recorder unit 10 according to the embodiment, the drive recorder unit 10 directly acquires the rear video from the rear camera 32, and transmits the acquired rear video to the display unit 20. Due to this, the display unit 20 does not necessarily have the transmission function for the rear video, and the existing display unit 120 can be diverted to the display unit 20 as it is. Thus, it is possible to suppress increase in cost and enlargement of the component mounting space due to addition of the transmission function.

Moreover, with the drive recorder unit 10 according to the embodiment, the display unit 20 (120) is interchangeable between the case of being connected to the drive recorder unit 10 and the case of not being connected thereto, so that increase in the number of components can be suppressed.

With the drive recorder unit 10 according to the embodiment, the drive recorder unit 10 includes the main microcomputer 11 and the sub-microcomputer 12 that operate independent of each other. With this configuration, once the sub-microcomputer 12 is started, the rear video can be started to be displayed on the display device 25 without waiting for starting of the main microcomputer 11 that has a high load due to a recording function and the like and requires time for being started. Therefore, the display device 25 can be easily caused to conform to a safety standard of United Nations-Regulation 46 (UN-R46).

With the drive recorder unit 10 according to the embodiment, the drive recorder unit 10 includes the configuration belonging to the main control block 2 and the configuration belonging to the sub-control block 3 that operate independent of each other. Due to this, even in a case where a failure occurs in the main control block 2, the sub-control block 3 continuously operates, and the display device 25 can continuously display the rear video. Thus, the display device 25 can be easily caused to conform to the safety standard of UN-R46.

The drive recorder unit 10 according to the embodiment is assumed to handle the forward video and the rear video displayed on the display device 25, the panel type display 45, and the like, but the technique of the drive recorder unit 10 according to the embodiment can also be applied to a video displayed on another display such as a meter display or a head-up display.

The drive recorder unit 10 according to the embodiment may be integrated with an IVI system, and configured as part of the IVI system.

The drive recorder unit 10 according to the embodiment can also be used without being combined with the display device 25 such as an electron mirror. Also in such a case, the drive recorder unit 10 described above incorporated in the video processing system 1 can be diverted only by correcting software. For example, in a case of using the drive recorder unit 10 in combination with the display device 25, the drive recorder unit 10 has a function of communicating with the display device 25 and monitoring the display device 25 to restart the display device 25 when an anomaly in the display device 25 is detected. In a case of using the drive recorder unit 10 without being combined with the display device 25, the function can be eliminated by correcting software. Thus, a component is not required to be added to the drive recorder unit 10 along with diversion, so that increase in the number of components can be suppressed.

Some embodiments of the present disclosure have been described above, but these embodiments are merely examples, and do not intend to limit the scope of the invention. These embodiments can be implemented in other various forms, and can be variously omitted, replaced, and modified without departing from the gist of the invention. These embodiments and modifications thereof are encompassed by the scope and the gist of the present invention, and also encompassed by the invention described in claims and an equivalent thereof.

With the video processing device and the video processing system according to the present disclosure, desired quality of image can be obtained for videos used for various uses.

What is claimed is:

1. A video processing device installable in a vehicle, the vehicle including a first camera configured to image the outside of the vehicle and generate a first video, a first display configured to display a second video obtained by performing first processing on the first video, and a second display configured to display a third video obtained by performing second processing on the first video, the video processing device comprising:
   a first deserializer circuit configured to receive the first video from the first camera;
   a processor configured to perform the second processing on the first video to generate the third video;
   a first serializer circuit configured to transmit the first video to the first display directly; and
   a second serializer circuit configured to receive the third video from the processor and transmit the third video to the second display directly,
   wherein the first deserializer circuit is configured to transmit the first video to the processor.

2. The video processing device according to claim 1, further comprising:
   a first controller configured to control the first deserializer circuit and the first serializer circuit; and
   a second controller configured to control the processor and the second serializer circuit.

3. The video processing device according to claim 2, wherein the first controller and the second controller operate independent of each other.

4. The video processing device according to claim 1, further comprising a second deserializer circuit configured to receive a fourth video from a second camera, the second camera being installed in the vehicle to image the outside of the vehicle and generate the fourth video, wherein
   the processor is configured to generate a fifth video obtained by performing third processing on the fourth video, and
   the second serializer circuit is configured to transmit the fifth video to the second display.

5. The video processing device according to claim 4, wherein
   the first camera is configured to capture an image of a rearward view of the vehicle, and
   the first display is a mirror type display in a shape of a mirror for checking the rearward view of the vehicle.

6. The video processing device according to claim 4, wherein
   the second camera is configured to capture an image of a forward view of the vehicle, and
   the second display is a panel type display.

7. A video processing system installable in a vehicle, the video processing system comprising:
   a first camera configured to image the outside of the vehicle and generate a first video;
   a first display configured to display a second video obtained by performing first processing on the first video;
   a second display configured to display a third video obtained by performing second processing on the first video; and
   a video processing device configured to perform the second processing on the first video, wherein the video processing device includes:
      a first deserializer circuit configured to receive the first video from the first camera;
      a processor configured to perform the second processing on the first video to generate the third video;
      a first serializer circuit configured to transmit the first video to the first display directly; and
      a second serializer circuit configured to receive the third video from the processor and transmit the third video to the second display directly,
   wherein the first deserializer circuit is configured to transmit the first video to the processor.

8. The video processing system according to claim 7, wherein the video processing device further includes:
   a first controller configured to control the first deserializer circuit and the first serializer circuit; and
   a second controller configured to control the processor and the second serializer circuit.

9. The video processing system according to claim 8, wherein the first controller and the second controller operate independently of each other.

10. The video processing system according to claim 9, wherein
    the first controller, the first camera, and the first display constitute a first block, and
    the second controller device and the second display constitute a second block.

11. The video processing system according to claim 10, wherein the first block and the second block operate independently of each other.

12. The video processing system according to claim 10, wherein the first block is configured to operate even when a failure occurs in the second block.

13. The video processing system according to claim 7, further comprising:
    a second camera configured to image the outside of the vehicle and generate a fourth video; and
    a second deserializer circuit configured to receive the fourth video from the second camera, wherein
    the processor is configured to generate a fifth video obtained by performing third processing on the fourth video, and
    the second serializer circuit is configured to transmit the fifth video to the second display.

14. The video processing system according to claim 13, wherein
    the first camera is configured to capture an image of a rearward view of the vehicle, and
    the first display is a mirror type display in a shape of a mirror for checking the rearward view of the vehicle.

15. The video processing system according to claim 13, wherein
    the second camera is configured to capture an image of a forward view of the vehicle, and
    the second display is a panel type display.

* * * * *